(12) United States Patent
Yeh et al.

(10) Patent No.: US 8,484,717 B2
(45) Date of Patent: Jul. 9, 2013

(54) ACCESSING METHOD AND MULTIMEDIA SYSTEM USING THEREOF

(75) Inventors: Benjamin Yeh, Taipei (TW); Yen-Ju Hsu, Palo Alto, CA (US); Shao-Hai Zhao, Jiangsu (CN); Tai-Wei Wang, Taipei (TW)

(73) Assignee: Sercomm Corporation, Taipei (TW)

( * ) Notice: Subject to any disclaimer, the term of this patent is extended or adjusted under 35 U.S.C. 154(b) by 476 days.

(21) Appl. No.: 12/757,258

(22) Filed: Apr. 9, 2010

(65) Prior Publication Data

US 2010/0263039 A1    Oct. 14, 2010

Related U.S. Application Data

(60) Provisional application No. 61/168,392, filed on Apr. 10, 2009.

(51) Int. Cl.
*G06F 9/00* (2006.01)
*G06F 15/16* (2006.01)
*G06F 17/00* (2006.01)

(52) U.S. Cl.
USPC ......................................................... 726/11

(58) Field of Classification Search
USPC ......................................................... 726/11
See application file for complete search history.

(56) References Cited

U.S. PATENT DOCUMENTS

2009/0327187 A1* 12/2009 Lo et al. .......................... 706/46
2010/0228779 A1* 9/2010 Sim et al. ...................... 707/782

OTHER PUBLICATIONS

Peer-to-Peer Communication Across Network Address Translators Bryan Ford (Massachusetts Institute of Technology), Pyda Srisuresh (Caymas Systems, Inc.), Dan Kegel Feb. 17, 2005.*

* cited by examiner

*Primary Examiner* — Kambiz Zand
*Assistant Examiner* — Benjamin Kaplan
(74) *Attorney, Agent, or Firm* — McClure, Qualey & Rodack, LLP

(57) ABSTRACT

The access method includes the following steps. Firstly, multimedia data is accessed with a multimedia access device located on a local network, which connected to a public network via a network address translation (NAT) or firewall device. Next, first communication link between a portal server and the multimedia access device is established. Then a piece of punch-through information indicating whether the multimedia access device can punch through the NAT/firewall device is obtained in response to an inquiry command provided by a client device. Next, when the multimedia access device cannot punch through the NAT/firewall device, the multimedia data is pushed from the multimedia access device to the portal server and the multimedia data pushed to the portal server is further pulled from the portal server to the client device, so that multimedia data transmission between the client device and the multimedia access device can be obtained.

9 Claims, 3 Drawing Sheets

ACCESSING METHOD AND MULTIMEDIA SYSTEM USING THEREOF

This application claims the benefit of U.S. provisional application No. 61/168,392, filed Apr. 10, 2009, the subject matter of which is incorporated herein by reference.

BACKGROUND OF THE INVENTION

1. Field of the Invention

The invention relates in general to a multimedia system, and more particularly to a multimedia system capable of carrying out data transmission between a remote client device and a multimedia access device on a local network without punching through the network address translation (NAT) or firewall device of the local network.

2. Description of the Related Art

In the present ages, network masquerading techniques have been well developed and applied for hiding an entire local network addresses behind a single public address. Generally, a network address translation (NAT) or firewall device is used in conjunction with the network masquerading. The NAT/firewall device is run on a router to map addresses behind the router to a single destination address, using different ports. Thus, for stations on the public network, it appears that the IP packets are sent from the router.

However, the networks apply NAT/firewall techniques have some undesired problems. For example, when two computers, which are both behind their NAT/firewall devices, try to connect with each other, neither of them will be able to do so because no address mapping scheme exists. This is a problem with voice communication, peer to peer games, or games where your client device operates as the host device and is positioned behind a NAT/firewall device.

Conventionally, users have to setup a port mapping scheme i.e. scheme for punch through the NAT/firewall devices on their routers, so as to solve the up mentioned situation. However, this is a challenging task and inconvenient situation for the users. Thus, how to develop a way to fix the up-mentioned problem is a prominent goal for the industries.

SUMMARY OF THE INVENTION

The invention is directed to a multimedia system. The multimedia system includes a multimedia access device for pushing multimedia data to a portal server when the network address translation (NAT) or firewall device of the multimedia access device cannot be punched through. The multimedia data pushed to the portal server are further pulled to the client data, so that multimedia data transmission operation between the multimedia access device and the client device can be achieved. Thus, in comparison to the conventional punch through scheme, the multimedia system directed by the invention is capable of accessing remote multimedia device with the NAT/firewall device not punched through, and advantageously capable of accessing remote multimedia device with user friendly and convenient approach.

According to a first aspect of the present invention, a multimedia system is provided. The multimedia system includes a client device, a multimedia access device, and a portal server. The client device provides an inquiry command. The multimedia access device is located on a first local network, which is connected to a public network via a NAT/firewall device and the multimedia access device further establishes a first communication link. The portal server is located on the public network and connected to the multimedia access device via the first communication link. The portal server obtaining a piece of first punch-through information indicating whether the multimedia access device can punch through the first NAT/firewall device in response to the inquiry command. The portal server further reports the first punch-through information to the client device via a second communication link between the portal server and the first client device. When the multimedia access device cannot punch through the first NAT/firewall device, the portal server controls the multimedia access device via a third communication link to push the multimedia data to the portal server, and the client device further pulls the multimedia data on the portal server to the client device, so that multimedia data transmission between the client device and the multimedia access device can be obtained.

According to a second aspect of the invention, an access method applied in a multimedia system, which comprises a client device, a portal server, and a multimedia access device, is provided. The access method includes the following steps. Firstly, multimedia data is accessed by using the multimedia access device located on a first local network, which connected to a public network via a first NAT/firewall device. Next, first communication link between the portal server and the multimedia access device is established. Then a piece of first punch-through information indicating whether the multimedia access device can punch through the first NAT/firewall device is obtained in response to an inquiry command provided by the client device. Next, when the multimedia access device cannot punch through the first NAT/firewall device, the multimedia data is pushed from the multimedia access device to the portal server and the multimedia data pushed to the portal server is further pulled from the portal server to the client device, so that multimedia data transmission between the client device and the multimedia access device can be obtained.

The invention will become apparent from the following detailed description of the preferred but non-limiting embodiments. The following description is made with reference to the accompanying drawings.

DETAILED DESCRIPTION OF THE INVENTION

The multimedia system according to the present embodiment of the invention employs a portal server for carrying out transmission relay service, so that data transmission between device behind their network address translation (NAT) or firewall devices can be achieved without punching through the corresponding NAT/firewall devices.

Figure 1:
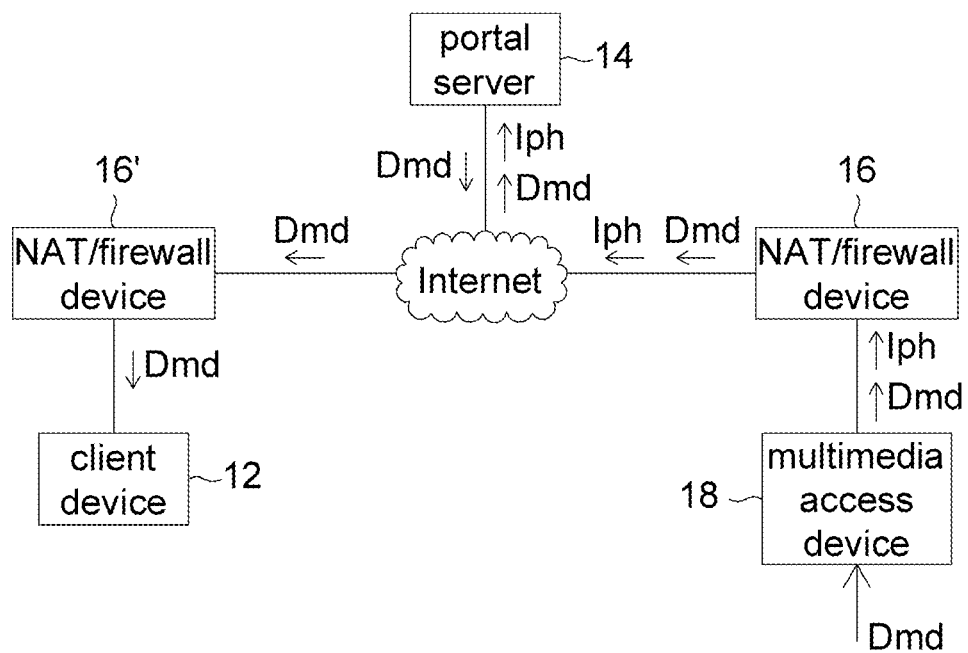
FIG. 1 shows a block diagram of the multimedia system according to the present embodiment of the invention

Referring to FIG. 1, a block diagram of the multimedia system according to the present embodiment of the invention is shown. The multimedia system 1 according to the present embodiment of the invention includes a client device 12, a portal server 14, and a multimedia access device 18. For example, the client device 12 is a computer system, such as a desk top computer, a laptop computer, a hand held device, and so forth. For example, the multimedia system 1 is a computer system with multimedia access capabilities. In an example, the multimedia system 1 is a computer system with digital camera capable of capturing video data and providing the corresponding multimedia data Dmd.

The multimedia access device 18 is located on a local network. The local network is connected to a public network, for example, the Internet, via a NAT/firewall device 16. For example, the NAT/firewall device 16 is a router or a gateway device capable of carrying out NAT/firewall operation.

The multimedia access device 18 carries out punch-through operation on the NAT/firewall device 16. For example, the multimedia access device 18 operates as a universal plug and play (UPnP) controller for performing NAT/firewall traversal actions, such as retrieving the external IP address of the NAT/firewall device 16, enumerating existing port mappings, and adding and removing port mappings.

The multimedia access device 18 further automatically establishes a first communication link between the portal server 14 and the multimedia access device 18. The multimedia access device 18 further periodically communicates with the portal server 14 for updating information to the portal server 14 using the first communication link, so as to keep the first communication link alive between the multimedia access device 18 and the portal server 14. For example, the first communication link is a network path employing transmission control protocol (TCP) with port 80 through the NAT/firewall device 16. The network path, for example, employs hypertext transfer protocol (HTTP) or hypertext transfer protocol secure (HTTPS) as the corresponding application layer protocol.

Similar to the multimedia access device 18, the client device 12 is also connected to the public network via a NAT/firewall device 16'. The client device 12 establishes second communication link between the portal server 14 and the client device 12 in response to operations performed by users. For example, the second communication link is also a network path employing TCP with port 80. The client device 12 further provides an inquiry command to the portal server 14. The client device 12 further reports its status information, such as whether the client device 12 can punch through the NAT/firewall device 16', IP address, MAC address, and so on, to the portal server 14. In an example, the status information indicates the client device 12 cannot punch through the NAT/firewall device 16'.

The portal server 14 is located on the public network. The portal server 14 is connected to the client device 12 via the second communication link. In an example, the portal server 14 provides domain name for carrying out device naming operation. For example, the portal server 14 further provides camera management service (CMS), so that the portal server 14 is able to manage the operations of the multimedia access device 18 via, for example, hypertext transfer protocol (HTTP) using port 80.

The portal server 14 obtains a piece of punch-through information Iph, which indicates whether the multimedia access device 18 can punch through the NAT/firewall device 16, in response to the inquiry command. The portal server further reports the punch-through information Iph to the client device 12 via the second communication link. In an embodiment, the portal server 14 obtains the punch-through information Iph by pinging the multimedia access device 18. For example, the pining operation is performed with common gate interface (CGI) commands.

In a first situation that the multimedia access device 18 cannot punch through their NAT/firewall device 16, the portal server 14 controls the multimedia access device 18 via control sessions of third communication link between the multimedia access device 18 and the portal server 14 to push the multimedia data Dmd to the portal server 14. For example, the third communication link for pushing the multimedia data Dmd to the portal server 14 is a network path employing HTTP. In other example, the third communication link can also be implemented with anyone among HTTPS, real-time transport protocol (RTP)/real-time streaming protocol (RTSP), RTP over user datagram protocol (UDP), RTP/RTSP over TCP, and RTP/RTSP over HTTP/HTTPS. The client device further pulls the multimedia data Dmd on the portal server 14 to the client device 12 via the second communication link, so that multimedia data transmissions between the client device 12 and the multimedia access device 18 can be obtained with the NAT/firewall device 16 not punched through. For example, the client device 12 employs services of object linking and embedding (OLE), so that an ActiveX object or player plug-in is used to pull multimedia data Dmd from the portal server 14 to the client device 12. For example, the portal server 14 further provides a relay service for receiving the pushed multimedia data Dmd and having it pulled to the client device 12 later on.

In a second situation that the multimedia access device 18 can punch through the NAT/firewall device 16, the multimedia data Dmd are directly pulled from the multimedia access device 18 to the client device 12, so as to achieve the multimedia data transmissions between the client device 12 and the multimedia access device 18 directly.

Figure 2:
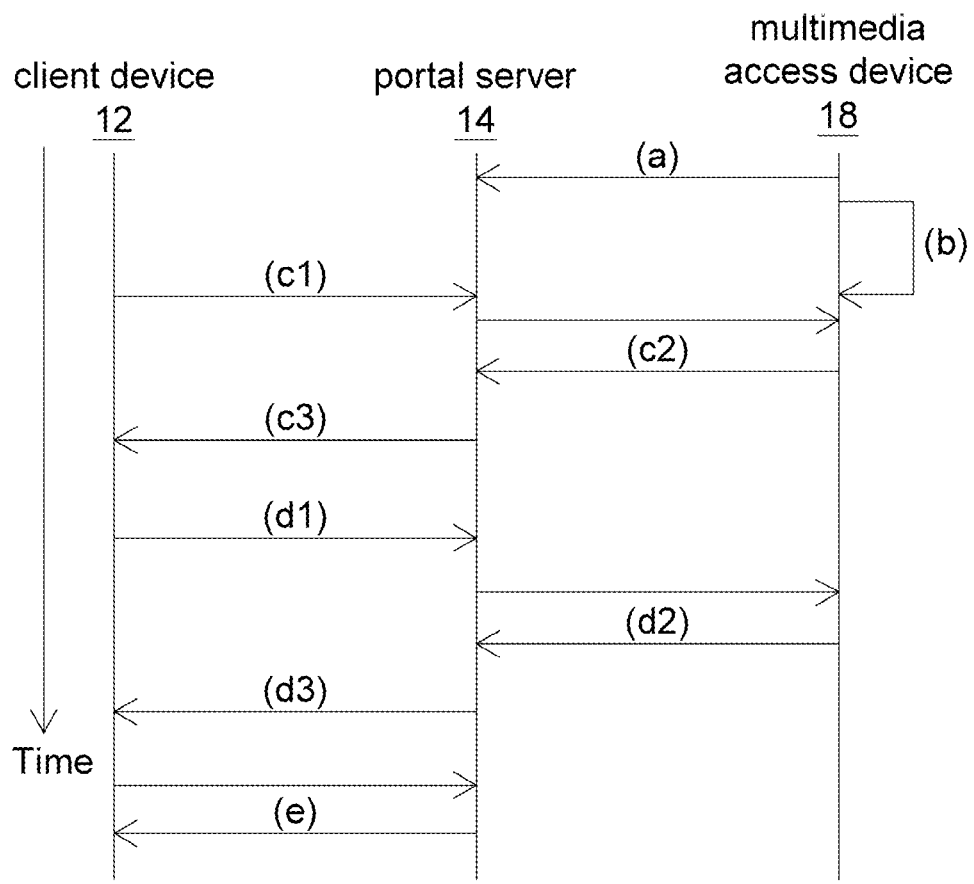
FIG. 2 shows a sequence diagram of the access method according to the present embodiment of the invention.

Referring to FIG. 2, a sequence diagram of the access method according to the present embodiment of the invention is shown. FIG. 2 shows the operation steps carried out by the multimedia system 1 in the just mentioned situation 1. For example, the access method includes the following steps. Firstly, step (a) is performed that the multimedia access device 18 establishes first communication link between the portal server 14 and the multimedia access device 18. Next step (b) is performed that the multimedia data Dmd is accessed by using the multimedia access device 18 located on the first local network, which connected to the public network via NAT/firewall device 16.

Then step (c) is performed that the portal server 14 obtains the punch-through information Iph indicating whether the multimedia access device 18 can punch through the first NAT/firewall device 16. In an example, step (c) includes sub-steps (c1)-(c3). In sub-step (c1), the client device 12 provides the inquiry command to the portal server 14. In sub-step (c2), the portal server 14 pings the multimedia access device 18 to determine whether the multimedia access device 18 can punch through the NAT/firewall device 16 and accordingly obtain the punch-through information Iph. In sub-step (c3), the portal server 14 reports the punch-through information Iph to the client device 12.

If the multimedia access device 18 cannot punch through the NAT/firewall device 16, then steps (d) and (e) are performed. In step (d), the multimedia data Dmd is pushed from the multimedia access device 18 to the portal server 14. After that, step (e) is performed that the multimedia data Dmd is pulled from the portal server 14 to the client device 12, so that multimedia data transmissions between the client device 12 and the multimedia access device 18 can be obtained.

In an example, step (d) includes sub-steps (d1)-(d3). In sub-step (d1), the client device 12 reports the status information to the portal server 14. In sub-step (d2), the portal server 14 drives the multimedia access device 18 by the third communication link to push the multimedia data Dmd to the portal server 14. In sub-step (d3), the portal server 14 further communicates with the client device 12 to have the client device 12 noticed that the relay service of the portal server 14 is ready.

Figure 3:
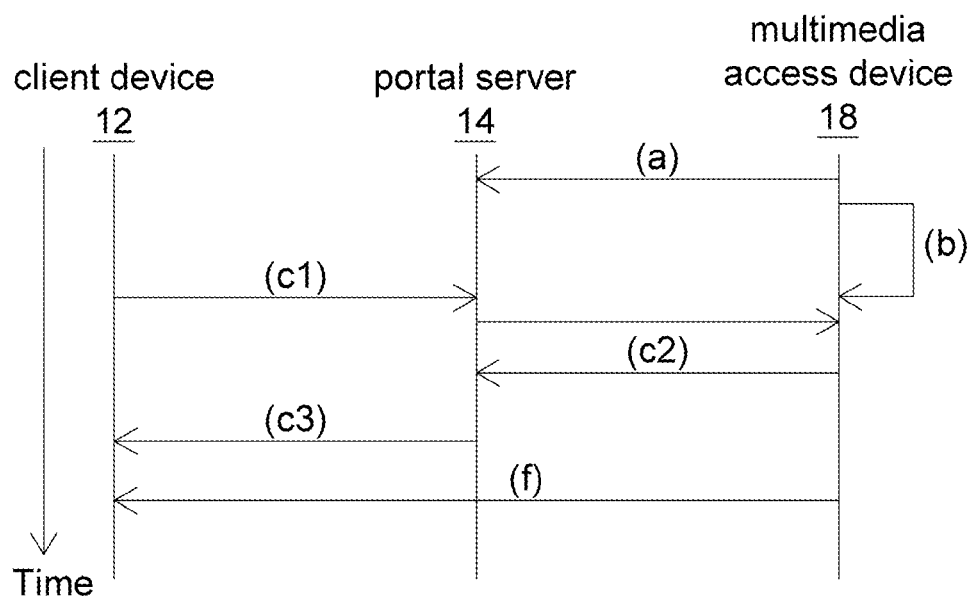
FIG. 3 shows another sequence diagram of the access method according to the present embodiment of the invention.

Referring to FIG. 3, another sequence diagram of the access method according to the present embodiment of the invention is shown. FIG. 3 shows the operation steps carried out by the multimedia system 1 in the just mentioned situation 2. The operation steps in FIG. 3 is different in that instead of performing steps (c), (d), and (e), step (f) is performed the multimedia data Dmd are directly pulled from the multimedia access device 18 to the client device 12, so as to achieve the multimedia data transmissions between the client device 12 and the multimedia access device 18 directly.

Though only the situation that the multimedia access device 18 is a computer system with a camera is illustrated in the present embodiment of the invention, the multimedia access device 18 is not limited thereto and can be other multimedia access device. For example, the multimedia access device 18 can also be a computer system with a microphone (capable of capturing audio data), a multimedia processing unit (capable of providing video/audio broadcasting data), and so forth and the other kinds of multimedia data can also be transmitted from the multimedia access device to the client device through the access method depicted in FIG. 2 or FIG. 3.

Though only the situation that the client device 12 cannot punch through the NAT/firewall device 16' is illustrated in the present embodiment of the invention, the client device 12 is not limited thereto. For example, when the situation that the client device 12 can punch through the NAT/firewall device 16' occurs, the multimedia data transmissions between the client device 12 and the multimedia access device 18 can also be achieved with the access method depicted in FIG. 2 when the multimedia access device 18 can punch through the NAT/firewall device 16 or the method depicted in FIG. 4 when the multimedia access device 18 cannot punch through the NAT/firewall device 16.

Figure 4:
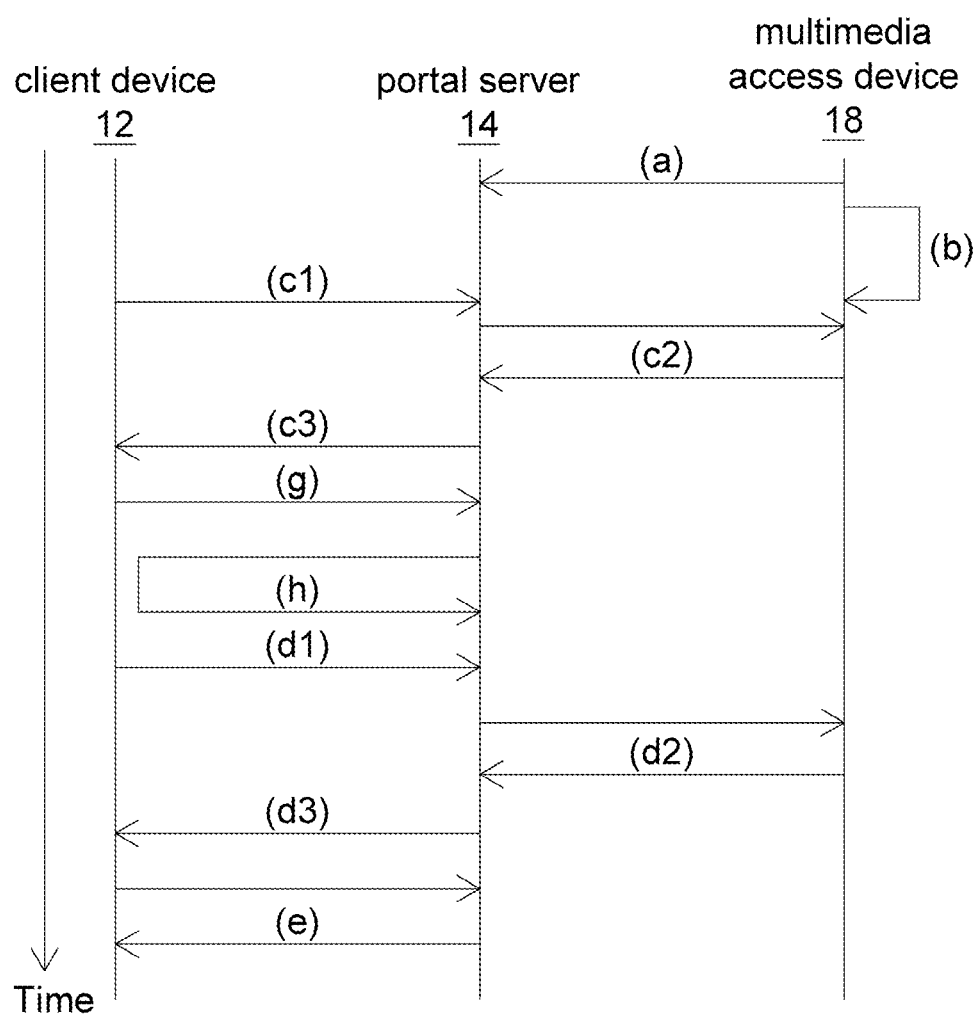
FIG. 4 shows still another sequence diagram of the access method according to the present embodiment of the invention.

The access method shown in FIG. 4 is different from that in FIG. 3 in that steps (g) and (h) are performed between steps (c3) and (d1). In step (g), the client device 12 communicates with the portal server 14 with CGI commands to accordingly the port of the portal server 14 when the client device 12 successfully punches through the NAT/firewall device 16'. In step (h), the portal server 14 pings the client device 12 with CGI commands to determine whether the client device 12 has successfully punched through the NAT/firewall device 16'.

The multimedia system according to the present embodiment of the invention includes a multimedia access device, which is connected to the Internet via a NAT/firewall device, used for pushing multimedia data to a portal server when its NAT/firewall device not punched through. The multimedia data pushed to the portal server are further pulled to the client data with the relay service provided by the portal server. Thus, in comparison to the conventional punch through scheme, the multimedia system according to the present embodiment of the invention is capable of accessing remote multimedia device with the NAT/firewall device not punched through, and advantageously capable of accessing remote multimedia device with user friendly and convenient approach.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multimedia system, comprising:
a client device, providing an inquiry command;
a multimedia access device, located on a first local network, which is connected to a public network via a first network address translation (NAT) or firewall device, the multimedia access device further establishing a first communication link and accessing multimedia data; and
a portal server, located on the public network and connected to the multimedia access device via the first communication link, the portal server obtaining a piece of first punch-through information indicating whether the multimedia access device can punch through the first NAT/firewall device in response to the inquiry command, the portal server further reporting the first punch-through information to the client device via a second communication link between the portal server and the client device, wherein,
when the multimedia access device cannot punch through the first NAT/firewall device, and the client device cannot punch through the second NAT/firewall device, the portal server controls the multimedia access device via a third communication link to push the multimedia data to the portal server, and the client device further pulls the multimedia data on the portal server to the client device, so that multimedia data transmission between the client device and the multimedia access device can be achieved,
when the multimedia access device cannot punch through the first NAT/firewall device, and the client device can punch through the second NAT/firewall device, the client device communicates with the portal server with a common gate interface commands to accordingly a port of the portal server when the client device successfully punches through the second NAT/firewall device, and the portal server pings the client device with the common gate interface commands to determine whether the client device has successfully punched through the second NAT/firewall device.

2. The multimedia system according to claim 1, wherein when the multimedia access device can punch through the first NAT/firewall device, the client device directly pulls the multimedia data from the multimedia access device to the client device, so as to achieve the multimedia data transmission between the client device and the multimedia access device directly.

3. The multimedia system according to claim 1, wherein,
the client device is located on a second local network, which is connected to the public network via a second NAT/firewall device; and
the portal server further obtains a piece of second punch-through information indicating whether the client device can punch through the second NAT/firewall device via the second communication link.

4. The multimedia system according to claim 1, wherein the multimedia access device periodically updates information to the portal server, so as to keep the first communication link alive between the multimedia access device and the portal server.

5. An access method applied in a multimedia system, which comprises a client device, a portal server, and a multimedia access device, the access method comprising:
accessing multimedia data by using the multimedia access device located on a first local network, which connected to a public network via a first network address translation (NAT) or firewall device;

establishing a first communication link between the portal server and the multimedia access device;

obtaining a piece of first punch-through information indicating whether the multimedia access device can punch through the first NAT/firewall device in response to an inquiry command provided by the client device;

when the multimedia access device cannot punch through the first NAT/firewall device, and the client device cannot punch through the second NAT/firewall device, pushing the multimedia data from the multimedia access device to the portal server via a third communication link; and when the multimedia access device cannot punch through the first NAT/firewall device, the multimedia data are pulled from the portal server to the client device, so that multimedia data transmission between the client device and the multimedia access device can be achieved, when the multimedia access device cannot punch through the first NAT/firewall device, and the client device can punch through the second NAT/firewall device, the client device communicates with the portal server with a common gate interface commands to accordingly a port of the portal server when the client device successfully punches through the second NAT/firewall device, and the portal server pings the client device with the common gate interface commands to determine whether the client device has successfully punched through the second NAT/firewall device.

6. The access method according to claim 5, further comprising:
when the multimedia access device can punch through the first NAT/firewall device, directly pulling the multimedia data from the multimedia access device to the client device, so as to obtain the multimedia data transmission between the client device and the multimedia access device.

7. The access method according to claim 5, wherein the client device is located on a second local network, which is connected to the public network via a second NAT/firewall device.

8. The access method according to claim 7, further comprising:
obtains a piece of status information indicating whether the client device can punch through the second NAT/firewall device.

9. The access method according to claim 5, further comprising:
periodically updating information to the portal server by using the multimedia access device, so as to keep the first communication link alive between the multimedia access device and the portal server.

* * * * *